United States Patent
Cakmaz

[11] Patent Number: 5,144,881
[45] Date of Patent: Sep. 8, 1992

[54] VALVE ARRANGEMENT, FOR EXAMPLE A PROPORTIONAL VALVE

[75] Inventor: Aydogan Cakmaz, Stuttgart, Fed. Rep. of Germany

[73] Assignee: Mercedes-Benz AG, Fed. Rep. of Germany

[21] Appl. No.: 615,249

[22] Filed: Nov. 19, 1990

[30] Foreign Application Priority Data

Nov. 18, 1989 [DE] Fed. Rep. of Germany ....... 3938417

[51] Int. Cl.[5] .................... F15B 11/08; F15B 13/044
[52] U.S. Cl. .................................. 91/451; 91/459;
137/625.65; 137/596.17
[58] Field of Search ............ 91/459, 449, 451;
137/625.65, 596.17

[56] References Cited

U.S. PATENT DOCUMENTS

| | | | |
|---|---|---|---|
| 4,620,565 | 11/1986 | Brown | 137/625.65 |
| 4,844,119 | 7/1989 | Martinic | 137/625.65 |
| 5,000,420 | 3/1991 | Hendrixon et al. | 137/625.65 |
| 5,036,885 | 8/1991 | Miura | 137/625.65 |
| 5,051,631 | 9/1991 | Anderson | 137/625.65 |

FOREIGN PATENT DOCUMENTS 3144362  5/1983  Fed. Rep. of Germany .

OTHER PUBLICATIONS

Article entitled "Olhydraulik" by Dr. Heinz Zoebl, Wion, Mit 439 Textabbildungen, 1963 pp. 261-262.

*Primary Examiner*—Edward K. Look
*Assistant Examiner*—Hoang Neuyen
*Attorney, Agent, or Firm*—Evenson, Wands, Edwards, Lenahan & McKeown

[57] ABSTRACT

As a result of an appropriate displacement of the control member, a connection of a fluid unit can, for pressure relief, be connected to a line leading to a low-pressure reservoir or be isolated from this line and/or, for the exertion of pressure, connected to a connection of a pressure source. Should the control member jam and be incapable of following an appropriate actuating stroke of a servomotor into the pressure-relieving position, a safety relief valve is opened by means of the actuating stroke.

16 Claims, 2 Drawing Sheets

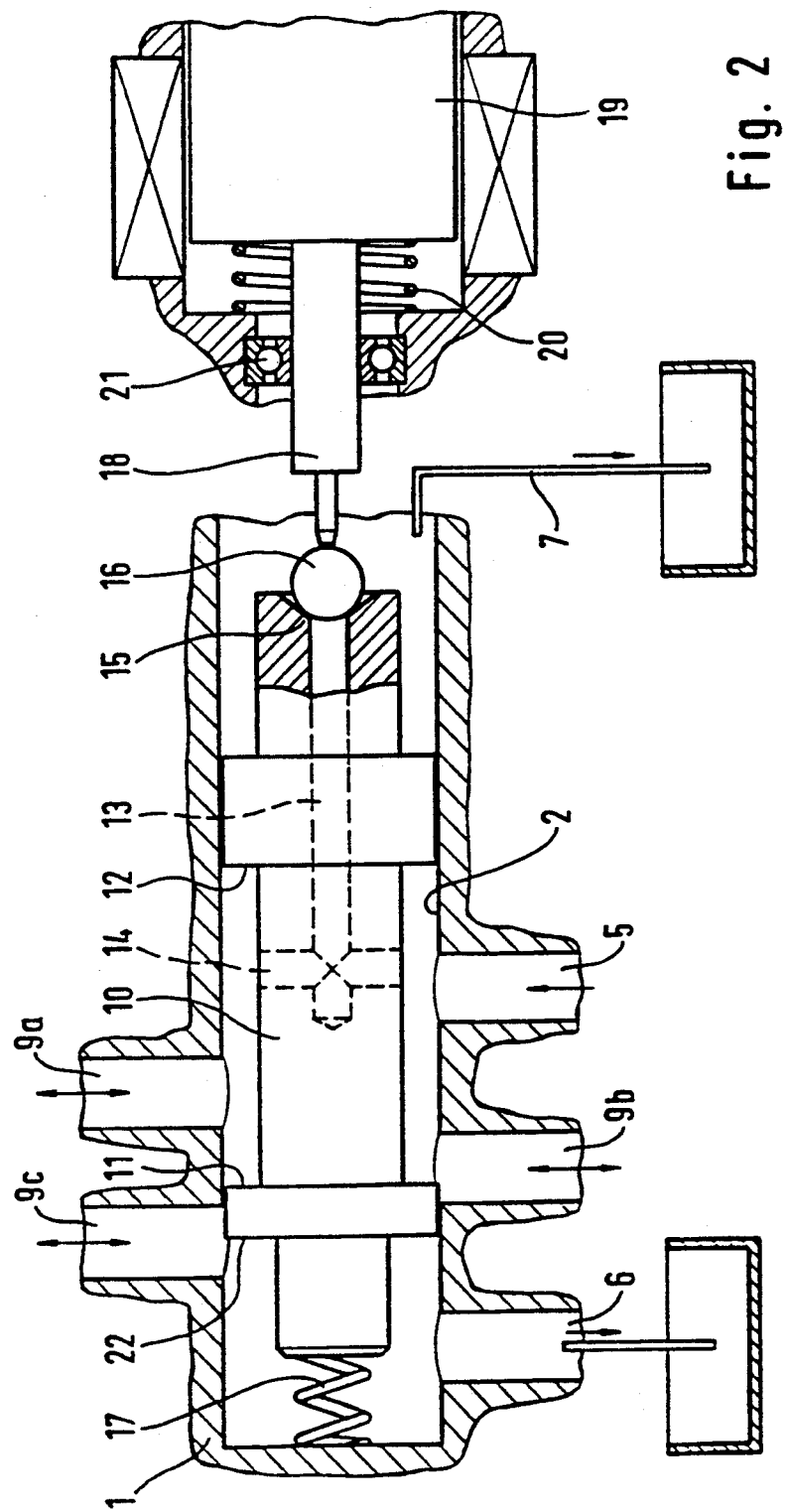

VALVE ARRANGEMENT, FOR EXAMPLE A PROPORTIONAL VALVE

BACKGROUND AND SUMMARY OF THE INVENTION

The invention relates to a valve arrangement, for example a proportional valve, for controlling the pressure of a connected fluid unit, with a control member which is adjustable by means of a servomotor, counter to a restoring force loading the control member, out of an initial position, in which the fluid unit communicates with a low-pressure reservoir, into an operating position, in which the fluid unit communicates with a pressure source via a connection controlled by the control member and/or is isolated from the low-pressure reservoir.

A valve arrangement of this type, designed as a proportional valve, is known, for example, from German Patent Document DOS 3,144,362.

Corresponding valve arrangements can serve, for example, on vehicles with all-wheel drive, for connecting a connectable driving axle to a main drive train or isolating it from this by appropriately actuating a fluid-controlled clutch.

The capacity for isolating the connectable axle from the main drive train in drive terms is important, above all, when the vehicle has a brake installation with an anti-lock system. In particular, systems of this type can as a rule work effectively only when the vehicle axles are uncoupled from one another in drive terms, that is to say when the speeds of the wheels of one axle are completely independent of the speeds of the wheels of another axle.

Even when the known valve arrangements used in this respect have a high degree of reliability, it is still impossible completely to prevent the possibility that the control member will jam or become sluggish and that the connectable driving axle will accordingly not be isolated from the main drive train or only with a long delay.

A valve arrangement is known from the manual of H. Zoebl "Ölhydraulik [Oil hydraulics]", Vienna, Springer-Verlag 1963, page 261, Figure 315, and by means of this a double-acting piston/cylinder unit can, for a particular actuating stroke in one direction or the other, be connected to a pressure source or be shut off form the pressure source, in such a way that the piston is retained immovably in the cylinder. Arranged at the connections of the cylinder chambers in each case are excess-pressure valves which limit the maximum pressure in the piston/cylinder unit. Nevertheless, in the event of a fault of the valve controlling the direction of movement of the piston or its blocking, the piston can remain stationary in a position undesirable per se.

The object of the invention is to guarantee in a valve arrangement of the type mentioned in the introduction an especially high operating safety, and at the same time, in particular, to obtain in response to an appropriate control of the servomotor a pressure relief of the fluid unit with an especially high degree of safety.

According to the invention, this object is achieved in that a passage, which leads from the fluid unit or from the connection controlled by the control member between the fluid unit and pressure source to the low-pressure reservoir, is controllable by means of a safety relief valve, the valve body of which is arranged as a transmission element between the servomotor and control member and is urged into the closing position by the servomotor when the servomotor loads the control member counter to the restoring force.

The invention is based on the general idea of transmitting the actuating force of the servomotor counteracting the restoring force of the control member to the control member via the valve body of the safety relief valve, specifically in such a way that the mutually counteracting actuating and restoring forces are exerted on the safety relief valve with a closing effect. The safety relief valve is consequently opened automatically when, with the control member being jammed or sluggish, the servomotor is actuated with the effect of a return to its position assigned to the initial position of the control member.

According to an especially preferred embodiment of the invention, the passage controlled by the safety relief valve can go through the control member, the valve body of the safety relief valve interacting with a seat of the safety relief valve, this seat being located at the low-pressure end of the passage. A seat-controlled valve of this type can afford an especially high degree of safety against malfunctioning.

There is fundamentally the possibility of connecting the valve body of the safety relief valve to an output member of the servomotor or to design it as part of this, so that, with the control member being jammed or sluggish, the valve body can actively be pulled away from the closing position by the servomotor when the servomotor seeks to return to its position assigned to the initial position of the control member.

Instead, it is also contemplated and advantageous if the valve body of the safety relief valve is arranged separately from the output member of the servomotor and is subjected to the pressure of the fluid unit in the opening direction. Thus, if the control member cannot follow the output member of the servomotor because of jamming or sluggishness, should the latter be returned to its position assigned to the initial position of the control member, the valve body between the control member and servomotor is relieved and pushed open by the pressure of the fluid unit.

As appropriate, the control member can control a plurality of lines which are assigned to different fluid units or different parts of a fluid unit and which, in the initial position of the control member, are all connected to the low-pressure reservoir and, in the event of a displacement of the control member counter to the restoring force, are successively isolated from the low-pressure reservoir and connected to the pressure source, and the passage leading to the low-pressure reservoir branches off from the connection controlled by the control member and, depending on the position of the control member, communicates with one or more of the lines and with the pressure source.

This arrangement takes into account the fact that, even when the control member jams or becomes sluggish, a safety pressure relief is superfluous for those lines which lead to the fluid units and which are already connected to the low-pressure reservoir by the control member. The passage leading to the low-pressure reservoir controlled by the safety relief valve is therefore connected only to the lines or fluid units which communicate with the pressure source in the particular position of the control member.

A valve arrangement of this type, by means of which a plurality of fluid units can be controlled, is suitable, for example, for vehicles with a connectable all-wheel drive and with a plurality of differential locks and affords the possibility first of coupling a connectable driving axle to the main drive train and then, as appropriate, also of successively actuating the lock of a central differential and the lock of axle differentials or successively releasing the actuated differential locks and then also once again uncoupling the connectable driving axle from the main drive train. This uncoupling is thus ensured even when the control member jams or becomes sluggish.

Other objects, advantages and novel features of the present invention will become apparent from the following detailed description of the invention when considered in conjunction with the accompanying drawings.

BRIEF DESCRIPTION OF THE DRAWINGS

FIG. 2 shows a corresponding sectional representation of an embodiment in which a plurality of fluid units can successively be subjected controllably to pressure and successively relieved controllably of the pressure.

DETAILED DESCRIPTION OF THE DRAWINGS

Figure 1:
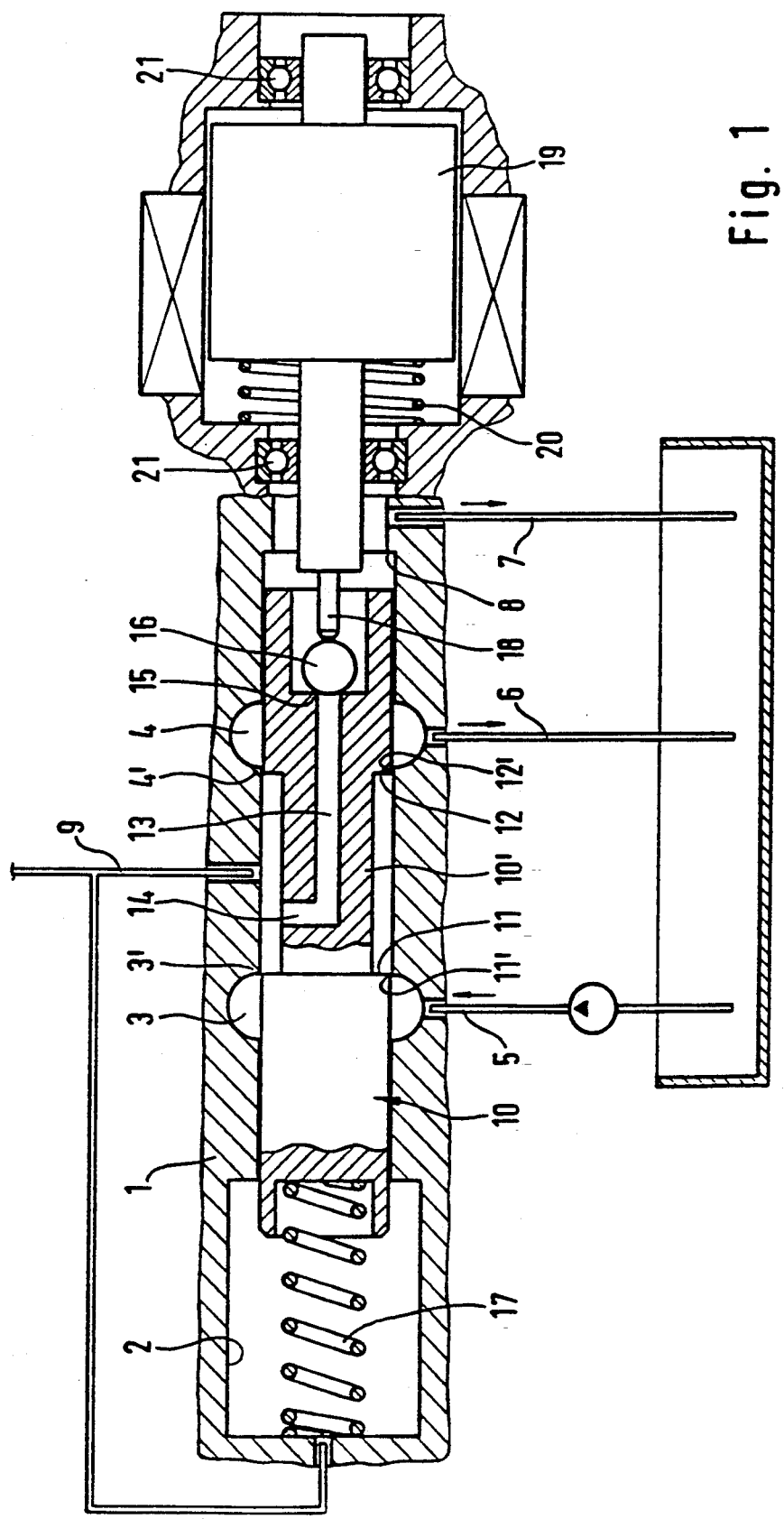
FIG. 1 shows a diagrammatic sectional representation of a valve arrangement according to the invention which is designed as a proportional valve and by means of which a fluid unit can be connected controllably to a pressure source and controllably relieved of the pressure.

In the embodiment illustrated in FIG. 1, a stepped bore 2 is arranged within a valve housing 1, the long middle portion of which is equipped with two annular grooves 3 and 4 spaced axially from one another. A connection 5 opens into the annular groove 3 and leads to a pressure source or to the delivery side of a pump. From the annular groove 4 a line 6 branches off via which the annular groove 4 is connected to a low-pressure reservoir. Arranged parallel to the line 6 is a line 7 which connects the low-pressure reservoir to the narrow region of the bore 2 adjacent to the annular step 8 on the right in FIG. 1.

A radial channel 9 branches off from the bore 2 between the annular grooves 3 and 4 and leads to a fluid unit (not shown).

The end of the bore 2 on the left in FIG. 1 is connected either to the radial channel 9 and to the fluid unit connected to this, as shown, or to the connection 5 and the pressure source or delivery side of the pump connected to it.

A piston-like slide 10 is guided with sliding displaceability in the middle portion of the bore 2 having the annular grooves 3 and 4. This slide 10 possesses a middle portion 10' of reduced diameter, such that two annular steps 11 and 12 with the annular edges 11' and 12' are formed on the circumference of the slide. The axial spacing of the annular steps 11 and 12 or annular edges 11' and 12' corresponds approximately to the axial spacing of the annular edges 3' and 4' on the mutually confronting flanks of the annular grooves 3 and 4 on the inside of the bore 2. As stated further below, the axial spacing of the annular edges 11' and 12' can be somewhat larger, but also somewhat smaller than the axial spacing of the annular edges 3' and 4'.

The slide 10 and the portion of the bore 2 having the annular grooves 3 and 4 are so calculated that the annular space formed within the annular groove 4 and located on the valve housing and the annular space formed between the annular steps 11 and 12 and located on the slide communicate with one another, without a throttle effect, via a wide annular gap formed between the annular edges 4' and 12', when the slide 10 assumes its initial position in which the end face of the slide 10 on the right in FIG. 1 bears against the annular step 8 of the bore 2.

Moreover, the slide 10 can be displaced so far to the left that the annular space formed within the annular groove 3 and located on the valve housing and the annular space formed between the annular steps 11 and 12 and located on the slide communicate with one another, essentially free of throttling, via an annular gap formed between the annular edges 3' and 11'.

Arranged within the slide 10 is an axial blind bore 13 which opens out on the right end face of the slide 10 and which communicates via a radial bore 14 with the annular space located on the slide between the annular steps 11 and 12.

The opening of the axial blind bore 13 on the right end face of the slide 10 forms a valve seat 15 for a spherical valve body 16 which is normally held in its closing position shutting off the opening of the axial blind bore 13, because the slide 10 is urged to the right, by means of a restoring spring 17 tensioned against its left end face, against a tappet-shaped output or actuating member 18 of an electromagnet 19 designed as an abutment for the spherical valve body 16. The arrangement is therefore such that the spherical valve body 16 is arranged between the slide 10 and the output or actuating member 18 as a force transmission member which transmits to the slide 10 a holding or actuating force generated by means of the electromagnet 19 and counteracting the force of the restoring spring 17.

When an appropriate current flow through the electromagnet 19, its output or actuating member 18 is displaced to a greater or lesser extent to the left in FIG. 1 or is held in a position displaced to the left. Insofar as the current flow through the electromagnet 19 is reduced sufficiently or cut off, the output or actuating member 18 is pushed to the right in FIG. 1 in the direction of an end position by a restoring spring 20, the slide 10 normally being advanced correspondingly by the restoring spring 17 and the spherical valve body 16 accordingly remaining in its closing position resting on the valve seat 15.

To guarantee that the output or actuating member 18 of the electromagnet 19 remains free of self-locking with a high degree of safety, ball bearings 21 are provided for mounting the output or actuating member 18.

The valve arrangement illustrated in FIG. 1 functions as follows:

When the slide 10 assumes a position in which the annular space formed between the annular steps 11 and 12 and located on the slide communicates solely either with the annular space located on the valve housing and in the annular groove 3 or with the annular space located on the valve housing and in the annular groove 4, then the radial channel 9 leading to a fluid unit is connected either to the pump or pressure source connected to the connection 5 or to the line 6 leading to the low-pressure reservoir. At the same time, the connecting paths between the radial channel 9 and the connection 5 or between the radial channel 9 and the line 6 are throttled to a greater or lesser extent according to the width of the annular gap between the annular edge 11' located on the slide and the annular edge 3' located on the valve housing or between the annular edge 12' located on the slide and the annular edge 4' located on the valve housing.

When, as shown in FIG. 1, the axial spacing of the annular steps 11 and 12 located on the slide is somewhat smaller than the axial spacing of the annular edges 3' and 4' located on the valve housing and on the mutually confronting flanks of the annular grooves 3 and 4, the slide 10 can also assume an intermediate position, in which the fluid unit connected to the radial channel 9 is shut off both from the connection 5 of the pump or pressure source and from the line 6 leading to the low-pressure reservoir. Depending on the amount of displacement travel of the slide 10 in relation to this intermediate position, there is then a more or less sharply throttled connection of the channel 9 to the connection 5 or line 6.

If, in contrast to the representation of FIG. 1, the axial spacing of the annular steps 11 and 12 located on the slide or of the annular edges 11' and 12' located on the slide is somewhat larger than the axial spacing of the annular edges 3' and 4' located on the valve housing and on the mutually confronting flanks of the grooves 3 and 4, the slide 10 can also assume intermediate positions, in which the annular space on the slide, formed between the annular steps 11 and 12 located on the slide, communicates with the two annular spaces located on the valve housing in the two annular grooves 3 and 4. In these intermediate positions, there is established between the annular steps 11 and 12 located on the slide and therefore at the channel 9 leading to the fluid unit a pressure of which the valve is between the low value of the pressure of the low-pressure reservoir at the line 6 and the high value of the pressure of the pressure source or pump at the line 5. Thus, the value of the pressure on the channel 9 can be finely regulated by displacing the slide 10, because, whenever the slide 10 is displaced, one of the annular gaps between the annular edges 3' and 11' or 4' and 12' is narrowed, whilst the other annular gap is widened, that is to say the throttle effect of one annular gap is increased, whilst the throttle effect of the other annular gap is reduced.

As already stated above, the valve formed by the valve seat 15 and valve body 16 is normally closed because the slide 10 is tensioned by the restoring spring 17 against the output or actuating member 18 of the electromagnet 19. In the example shown in FIG. 1, the fluid pressure prevailing at the channel 9 acts, so as to assist the restoring spring 17 on the end face of the slide 10 on the left in FIG. 1. The slide 10 therefore normally follows the movements of the output or actuating member 18.

However, should the slide 10 become sluggish or jam, it can no longer follow a movement of the output or actuating member 18 to the right in FIG. 1. This is equivalent to saying that, in such a case, the valve body 16 is relieved when the electromagnet 19 is activated with the effect of a displacement of its output or actuating member 18 to the right. Consequently, the valve formed by the valve seat 15 and by the valve body 16 can be pushed open by the pressure prevailing at the channel 9 and acting on the valve body 16 via the radial bore 14 and the axial bore 13 in the slide 10, with the result that the channel 9 is connected, via the bores 13 and 14 arranged in the slide, to the portion of the valve-housing bore 2 on the right of the slide 10 and therefore to the line 7 leading to the low-pressure reservoir. Accordingly, the fluid unit connected to the channel 9 is also relieved of the pressure when, with the slide 10 jammed, the output or actuating member 18 of the electromagnet 19 moves to the right in FIG. 1.

The valve formed by the seat 15 and by the valve body 16 therefore performs the function of a safety relief valve for the fluid unit connected to the channel 9 and guarantees, even when the slide 10 jams, that this unit can be made pressure-free.

Thus, if the valve arrangement illustrated in FIG. 1 is intended for controlling the pressure in a clutch which, on a vehicle with all-wheel drive, serves to couple a connectable driving axle to the main drive train, this clutch can be made pressure-free and therefore opened even when, because of sluggishness or jamming, the slide 10 cannot follow a displacement of the output or actuating member 18 of the electromagnet 19 to the right in FIG. 1.

In contrast to the arrangement illustrated in FIG. 1, the portion of the valve-housing bore 2 on the left of the slide 10 can also be connected to the connection 5 of the pressure source or pump, so that the pressure of the pressure source or pump always acts on the left end face of the slide 10 so as to assist the restoring spring 17.

It is also possible, furthermore, for the end portion of the bore 2 on the left of the slide 10 always to be pressureless, so that the slide 10 is urged to the right in FIG. 1 solely by the restoring spring 17.

In FIG. 1, the spherical valve body 16 is arranged separately from the output or actuating member 18. It is also possible, in principle, for the valve body 16 to be connected to the output or actuating member 18 or to form part of this member. This changes nothing in the functioning of the safety valve 15/16.

According to FIG. 2, the valve arrangement can be modified in such a way that, in the event of the displacement of the slide 10 to the left, a plurality of connections 9a to 9c connected to fluid units or parts of these can be connected successively to the connection 5 of a pressure source or pump or, in the event of the adjustment of the slide 10 to the right, can be connected in reverse order to the connection 6 of a low-pressure reservoir.

The slide 10 once again has a middle portion which is arranged between the annular steps 11 and 12 and the diameter of which is smaller than the inside diameter of the valve-housing bore 2. At the same time, the axial spacing of the annular steps 11 and 12 is calculated so that, in the event of a corresponding displacement of the slide 10, the annular space remaining between these annular steps 11 and 12 within the bore 2 can communicate with the connection 5 of the pressure source or pump and with all the channels 9a to 9c of the fluid units. In contrast, if the slide 10 is displaced so far to the right in FIG. 2 that the channels 9a to 9c are located on the left of an annular step 22 of the slide 10 confronting the left end face of the latter, whilst the connection 5 of the pressure source or pump still remains on the right of this annular step 22, then all the channels 9a to 9c are connected, via the region of the valve-housing bore, to the line 6 branching off on the left of the slide 10 from the bore 2 to the low-pressure reservoir.

If the slide assumes a position between the two above-mentioned positions, in which all the channels 9a to 9c are connected either to the connection 5 of the pump or pressure source or to the line 6 leading to the low-pressure reservoir, some of the channels, for example the channels 9a and 9b in FIG. 2, are connected to the connection 5 of the pressure source or pump, whilst others of these channels, for example the channel 9c in FIG. 2, communicate with the line 6 leading to the low-pressure reservoir.

Depending on the amount by which the portion of the slide 10 between the annular steps 11 and 22 overlaps the openings of the channels 9a to 9c into the valve-housing bore 2, the connection to the line 6 of the low-pressure reservoir or to the connection 5 of the pressure source or pump is throttled to a greater or less extent.

The axial spacing between the annular steps 11 and 22 located on the slide should be smaller than the diameter of the channels 9a to 9c in the direction of displacement of the slide 10, to guarantee that each of the channels 9a to 9c is connected to the line 6 of the low-pressure reservoir and/or to the connection 5 of the pressure source or pump in any position of the slide 10.

Should the slide 10 ever be incapable of following a lifting movement of the output or actuating member 18 of the electromagnet 19 to the right in FIG. 2 because of sluggishness or jamming, all the channels 9a to 9c are nevertheless relieved of pressure because, once again, the safety relief valve 15/16 is opened in the same way as was explained previously with reference to FIG. 1. Insofar as channels 9a to 9c cannot communicate with the line 6 leading to the low-pressure reservoir because of the particular blocked position of the slide 10, a passage to the line 7 leading to the low-pressure reservoir is then provided via the slide bores 13 and 14 by means of the open safety relief valve.

In contrast to the arrangement illustrated in FIG. 2, as appropriate, annular grooves corresponding to the annular grooves 3 and 4 in FIG. 1 can be arranged on the valve-housing bore 2 in the region of the openings of the lines, channels or connections 5, 6 and 9a to 9c.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A proportional valve, for controlling the presence of a connected fluid unit, with a control member which is adjustable by means of a servomotor, counter to a restoring force loading the control member, out of an initial position, in which the fluid unit communicates with a low-pressure reservoir, into an operating position, in which the fluid unit communicates with a pressure source via a connection controlled by the control member and/or is isolated from the low-pressure reservoir, wherein a passage, which leads from the fluid unit or from the connection controlled by the control member between the fluid unit and pressure source to the low-pressure reservoir, is controllable by means of a safety relief valve, the valve body of which is arranged as a transmission element between the servomotor and control member and is urged into the closing position by the servomotor when the servomotor loads the control member counter to the restoring force,
wherein said safety relief valve member is urged by the fluid pressure at the fluid unit to an open position communicating the fluid unit with the low pressure reservoir when the control member is jammed in a position communicating the high pressure to the fluid unit and the control member is moved away from the safety relief valve member.

2. Valve arrangement according to claim 1, wherein the passage goes through the control member, and the valve body interacts with a seat of the safety relief valve, this seat being located at the low-pressure end of the passage.

3. Valve arrangement according to claim 1, wherein the valve body is connected to an output or actuating member of the servomotor.

4. Valve arrangement according to claim 1, wherein the valve body is arranged separately from the output or actuating member of the servomotor and is subjected to the pressure of the fluid unit in the opening direction.

5. Valve arrangement according to claim 1, wherein the control member controls a plurality of lines which are assigned to different fluid units or different parts of a fluid unit and which, in the initial position of the control member, are all connected to the low-pressure reservoir and, in the event of a displacement of the control member counter to the restoring force, are successively isolated from the low-pressure reservoir and connected to the pressure source, and the passage leading to the low-pressure reservoir branches off from a connection controlled by the control member and, depending on the position of the control member, communicates with one or more of the lines and with the pressure source.

6. Valve arrangement according to claim 1, wherein the servomotor is free of self-locking.

7. Valve arrangement according to claim 6, wherein the output or actuating member of the servomotor is mounted by means of rolling or revolving elements.

8. Valve arrangement according to claim 1, wherein a piston-like slide is provided as a control member.

9. Valve arrangement according to claim 1, wherein a piston-like slide provided as a control member has one end face subjected to the pressure of the fluid unit or of the pressure source for the purpose of generating a restoring force.

10. Valve arrangement according to claim 2, wherein the valve body is connected to an output or actuating member of the servomotor.

11. Valve arrangement according to claim 2, wherein the valve body is arranged separately from the output or actuating member of the servomotor and is subjected to the pressure of the fluid unit in the opening direction.

12. Valve arrangement according to claim 5, wherein the servomotor is free of self-locking.

13. Valve arrangement according to claim 2, wherein a piston-like slide is provided as a control member.

14. Valve arrangement according to claim 1, wherein the fluid unit includes means for controlling a fluid controlled clutch for selectively engaging a drive axle to a main drive train of a multiple wheel drive vehicle.

15. Valve arrangement for controlling fluid pressure in a fluid unit, comprising:
a servo motor,
a control member operatively drivingly connected with the servomotor to move the control member against a restoring force from a control position communicating the fluid unit with a low pressure reservoir to an operating position communicating high pressure to the fluid unit,
and a safety relief valve for assuring connection of the servomotor to a low pressure reservoir in the event of jamming or slugginess of the control member, said safety relief valve including a movable safety relief valve member closing a passage opening to a servomotor actuator end of the control member, said safety relief valve member serving as a movable transmission element between the servomotor and control member, said safety relief valve member being urged into its closing position by the servomotor when the servomotor loads the control member against the restoring force, wherein said safety relief valve member is urged by the fluid pressure at the fluid unit to an open position communicating the fluid unit with the low pressure reservoir when the control member is jammed in a position communicating the high pressure to the fluid unit and the control member is moved away from the safety relief valve member.

16. Valve arrangement according to claim 15, wherein said safety relief valve is a ball valve disposed between the control member and actuating member.

* * * * *